United States Patent [19]

Aoyama

[11] 4,220,122
[45] Sep. 2, 1980

[54] HYDRAULIC VALVE LIFTER

[75] Inventor: Syunichi Aoyama, Yokohama, Japan

[73] Assignee: Nissan Motor Company, Limited, Yokohama, Japan

[21] Appl. No.: 941,855

[22] Filed: Sep. 13, 1978

[30] Foreign Application Priority Data

Sep. 14, 1977 [JP] Japan .............................. 52-111286

[51] Int. Cl.² ................................................ F01I 1/14
[52] U.S. Cl. ............................. 123/90.55; 123/90.46
[58] Field of Search ............... 123/90.12, 90.15, 90.16, 123/90.48, 90.52, 90.55, 90.56, 90.57, 90.58, 90.59, 90.46

[56] References Cited

U.S. PATENT DOCUMENTS

| 2,595,775 | 5/1952 | DeWrangell | 123/90.12 |
| 3,897,761 | 8/1975 | Fleischer | 123/90.55 |
| 4,128,085 | 12/1978 | Kunii | 123/90.46 |
| 4,153,016 | 5/1979 | Hausknecht | 123/90.15 |

Primary Examiner—Ronald H. Lazarus
Attorney, Agent, or Firm—Schwartz, Jeffery, Schwaab, Mack, Blumenthal & Koch

[57] ABSTRACT

A hydraulic valve lifter useful for but not limited to an automotive internal combustion engine of the overhead camshaft type, comprising two rockable members one of which is in engagement with the cam on the engine camshaft and the other of which is in engagement with the intake or exhaust valve of a power cylinder of the engine, wherein the two rockable members are pivotable about a common axis either as a single unit or independently of each other for taking up the clearance in the valve train to a degree which is continuously variable with prescribed operational conditions of the engine.

10 Claims, 11 Drawing Figures

HYDRAULIC VALVE LIFTER

FIELD OF THE INVENTION

The present invention relates in general to internal combustion engines for automotive use and more particularly to a hydraulic valve lifter forming part of a valve train of an automotive internal combustion engine.

BACKGROUND OF THE INVENTION

As is well known in the art, the intake and exhaust valves of an internal combustion engine are timed by the contours of the cams on the engine camshaft for opening and closing the intake and exhaust ports of the power cylinders of the engine at the proper timings to achieve best engine performance, especially, the best volumetric efficiency of the engine. The valve timings are usually determined in an attempt to obtain maximum intake and exhaust efficiencies when the engine is operating in full power conditions. The intake and exhaust valves thus timed are concurrently open at least in part at the end of the exhaust stroke and at the beginning of the intake stroke and gives a valve overlap period across the top dead center (TDC) in each cycle of operation of each power cylinder of the engine. During this part of the crankshaft rotation, the piston in each of the engine power cylinders moves very little in the cylinder and the valves are moved rapidly under high power conditions of the engine. Under low-to-medium power operating conditions of the engine, however, the valve overlap period is excessive with respect to the velocity of the piston movement and, as a consequence, the air-fuel mixture admitted into the combustion chamber of each power cylinder of the engine tends to blow by into the exhaust port of the cylinder or the exhaust gases to be discharged from the combustion chamber tend to be admixed to the fresh air-fuel mixture entering the combustion hamber of the cylinder. This is not only detrimental to the fuel economy of the engine but causes incomplete combustion of the mixture in the combustion chamber and thus gives rise to an increase in the concentration of the toxic unburned compounds in the exhaust gases resulting from the incomplete combustion of the mixture.

With a view to eliminating these problems, it has been proposed and put into practice to have an ordinary solid-type valve lifter superseded by a hydraulic valve lifter which is capable of continuously varying the opening and closing timing of an intake or exhaust valve in proper relationship to the output speed of the engine and thereby taking up the clearance in the valve train of the engine. A typical example of such a hydraulic valve lifter is shown in U.S. Pat. No. 4,020,806.

The hydraulic valve lifters which have thus far been proposed and put to practical use are, however, constructed and arranged to be compatible with push-rod engines rather than engines of the overhead camshaft type and, for this reason, difficulties are encountered in incorporating a known hydraulic valve lifter into an automotive internal combustion engine of the overhead camshaft type in which the movement of the valve lifter is transmitted to the intake or exhaust valve directly by a rocker arm.

The present invention contemplates provision of a hydraulic valve lift which is useful when incorporated into the valve train of an internal combustion engine of the overhead camshaft type.

SUMMARY OF THE INVENTION

In accordance with the present invention, there is provided a hydraulic valve lifter for an internal combustion engine having at least one power cylinder including intake and exhaust valves, a cam for operating at least one of the valves and a source of fluid under pressure continuously variable with the power output of the engine, comprising a shaft having a center axis therethrough, a first rockable member pivotable on the shaft about the center axis of the shaft and engaging the aforesaid cam, a second rockable member pivotable on the shaft about the center axis of the shaft and engaging at least one of the intake and exhaust valves, the first and second rockable members being formed with respective concavities forming in combination an annular cavity encircling an axial portion of the above mentioned shaft, first and second partition members fitting in the annular cavity and rotatable with the first and second rockable members, respectively, on the aforesaid axial portion of the shaft about the center axis of the shaft, the first and second partition members forming therebetween two arcuately curved variable-volume fluid chambers which are continuously variable in volume in complementary relationship to each other depending upon the relative angular position between the above mentioned shaft and each of the partition members, the aforesaid shaft having formed in the above mentioned axial portion thereof a fluid passageway which is in constant communication with the above mentioned source of fluid under pressure and which is open to at least one of the variable-volume chambers or closed by at least one of the first and second partition members depending upon the relative position between the aforesaid shaft and each of the partition members. In preferred embodiment of the present invention, the shaft carrying the first and second rockable members as above described is rotatable about the center axis of the shaft and is operatively connected to control and drive means which are responsive to preselected operational conditions of the vehicle such as for example the engine speed, the load on the engine or the vehicle speed. By way of example, the drive means may include a lever rotatable with the shaft about the center axis thereof and arranged to drive the shaft to turn through an angle and in a direction which are dictated by a signal supplied from the control signal. The fluid passageway in the shaft is formed diametrically and is open to or isolated from at least one of the above mentioned variable-volume chambers depending upon the relative angular position of the shaft and each of the partition members about the center axis of the shaft.

DESCRIPTION OF THE DRAWINGS

The features and advantages of a hydraulic valve lifter provided by the present invention over prior-art hydraulic valve lifters will be more clearly understood from the following description taken in conjunction with the accompanying drawings in which like reference numerals designate corresponding or similar elements, structures and spaces and in which.

DETAILED DESCRIPTION OF THE PRIOR ART

Figure 1:
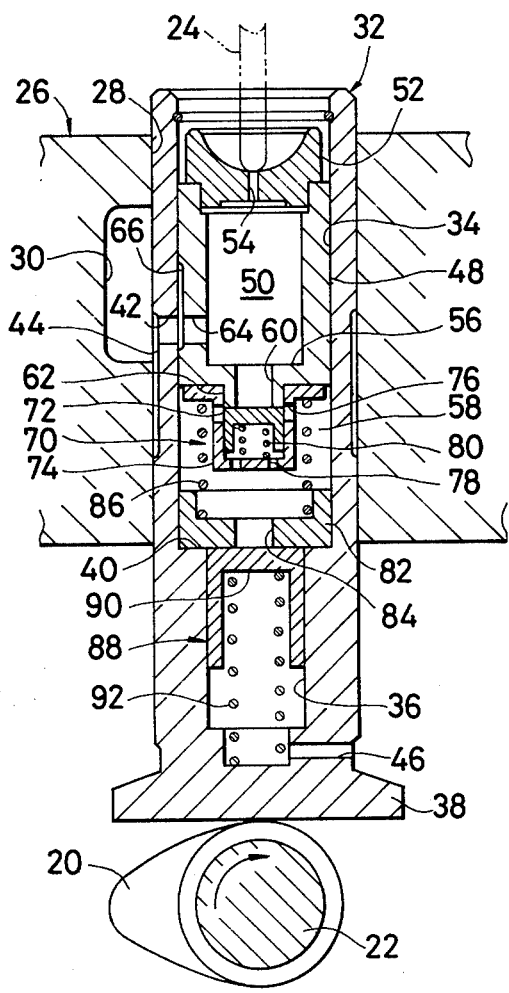
FIG. 1 is a longitudinal sectional view showing a prior-art valve lifter used typically in a push-rod internal combustion engine.

Referring to FIG. 1 of the drawings, a hydraulic valve lifter provided in an automotive internal combustion engine of the push-rod type forms part of the valve train of the internal combustion engine and is arranged to operatively intervene between a cam 20 fixedly mounted on or integral with a camshaft 22 and a push-rod 24 connected to the rocker arm (not shown) of a power cylinder of the engine. Though not shown, the camshaft 22 is operatively connected to the crankshaft of the engine through suitable power transmission means such as a chain and sprocket or belt and pulley arrangement or a gear combination so as to be driven to rotate about the center axis thereof at a speed constantly proportional to the output speed of the engine throughout operation of the engine. The cam 20 is rotatable with the camshaft 22 about the center axis of the latter and is constantly engaged by the valve lifter so that the push-rod 24 and accordingly the rocker arm connected thereto are driven in cycles dictated by the output speed of the engine. The rocker arm connected to the push-rod 24 is engaged by the intake or exhaust valve (not shown) of each power cylinder of the engine so that the valve is operated to open and close each time the cam 20 makes a full turn about the center axis of the camshaft 22, as is well known in the art.

In the arrangement illustrated in FIG. 1, the valve lifter is slidably fitted to the cylinder block 26 of the engine through a bore 28 formed in the cylinder block in such a manner as to be partly contiguous to an engine oil gallery 30 which is also formed in the cylinder block 26. The engine oil gallery 30 forms part of the lubricating system of the engine and is thus in constant communication with the delivery side of the engine oil pump (not shown) for delivering lubricating oil under pressure when the engine is in operation. As is well known in the art, the engine oil pump provided in an automotive internal combustion engine is driven by the crankshaft of the engine so that the pressure of the engine oil delivered from the pump continuously varies with the output speed of the engine between a certain maximum value obtained at the maximum engine speed and a certain minimum valve obtained during idling of the engine.

The mechanical construction of the hydraulic valve lifter shown in FIG. 1 is per se well known in the art from, for example, U.S. Pat. No. 4,020,806 as previously noted and comprises a hollow lifter cylinder 32 which is axially slidable through the above mentioned bore 28 in the cylinder block 26 and which has one axial end portion projecting from the cylinder block 26 for engagement with the cam 20 on the camshaft 22. The lifter cylinder 32 is formed with a first axial bore 34 open at one end of the cylinder 32 and terminating approximately halfway of the cylinder, and a second axial bore 36 contiguous at one end to the first axial bore 34 and closed at the other end by an end wall portion 38 of the cylinder 32. The second axial bore 36 is smaller in diameter than the first axial bore 34 so that the cylinder is formed with an annular internal ledge portion 40 having an end face at the inner end of the first axial bore 34 as shown. The end wall portion 38 of the cylinder 32 has a smooth, flat or slightly concave end face contacted by the cam 20. The first axial bore 34 is in constant communication with the above mentioned engine oil gallery 30 in the cylinder block 26 through an opening 42 and an axial undercut 44 which are formed in the cylinder 32. The lifter cylinder 32 is further formed with a breather port 46 for providing constant communication between the second axial bore 36 and the open air.

A hollow cylinder 48 is axially slidable in the first axial bore 34 and is formed with an axial bore 50 which is closed at its outer axial end by a generally cup-shaped push-rod seat member 52 having a dished outer face against which the push-rod 24 slidably bears at its rounded end. The push-rod seat member 52 is formed with an aperture 54 for providing communication between the first axial bore 34 in the lifter cylinder 32 and the oil conducting passageway (not shown) which is formed in the push-rod 24 for allowing passage of engine oil from the axial bore 34 to the rocker arm assembly, as is well known in the art. The plunger 48 has at its inner axial end an end wall portion 56 which forms in the first axial bore 34 in the lifter cylinder 32 a variable-volume chamber 58 which is defined between the end wall portion 56 of the plunger 48 and the end face of the above mentioned annular internal ledge portion 40 of the cylinder 32. The end wall portion 56 of the plunger 48 is formed with an axial opening 60 for providing communication between the axial bore 34 in the cylinder 32 and the above mentioned variable-volume chamber 58 in the plunger 48, and an annular projection 62 encircling the outer axial end of the opening 60. The plunger 48 is further formed with a radial opening 64 and an axial undercut 66 for providing constant communication between the bore 50 in the plunger 48 and the engine oil gallery 30 in the cylinder block 26 through the opening 42 and the axial undercut 44 in the lifter cylinder 32.

Within the variable-volume chamber 58 in the lifter cylinder 32 is provided a check valve assembly 70 which is positioned adjacent to the end wall portion 58 of the plunger 48. The check valve assembly 70 comprises a cup-shaped valve element 72 having a disc portion engageable with the annular projection 62 of the plunger 48. The valve element 72 is axially movably received within a generally cup-shaped valve retainer 74 having an annular flange portion secured to the end wall portion 56 of the plunger 48 and a hollow cylindrical portion axially projecting into the variable-volume chamber 36 in the lifter cylinder 32 and having the valve element 72 axially slidably received on the inner peripheral surface of the cylindrical portion. The hollow cylindrical portion of the valve retainer 74 is formed with apertures 76 for providing communication between the variable-volume chamber 36 in the cylinder 32 and the above mentioned axial opening 60 in the end wall portion 56 of the plunger 48 when the valve element 72 is unseated from the annular projection 62 of the end wall portion 56 as shown. The valve retainer 74 further has an end wall portion formed with apertures 78 providing constant communication between the interior of the valve element 72 and the variable-volume chamber 36 in the lifter cylinder 32. The valve element 72 is urged to axially move away from the apertured end wall portion of the valve retainer 74, viz., in a direction to close the apertures 76 in the cylindrical portion of the valve retainer 74 by means of a preloaded helical compression spring 80 which is positioned in part within the valve element 72.

Within the variable-volume chamber 36 in the lifter cylinder 32 is further provided a balancing piston 82 which is positioned opposite to the above described check valve assembly 70 and which is axially movable within the variable-volume chamber 36 toward and away from the end face of the annular internal ledge portion 40 of the lifter cylinder 32. The balancing piston 82 is formed with an opening 84 and is urged to axially move away from the check valve assembly 70 or to bear against the end face of the annular internal ledge portion 40 of the lifter cylinder 32 by means of a preloaded helical compression spring 84 which is seated between the balancing piston 82 and the annular flange portion of the valve retainer 74.

The prior-art hydraulic valve lifter shown in FIG. 1 further comprises a hollow cylindrical floating piston 88 which is axially slidable within the second axial bore 36 in the lifter cylinder 32. The floating piston 88 has at its end closer to the variable-volume chamber 36 in the cylinder 32 an end wall 90 which is engageable at its outer face with the above described balancing piston 82 and is urged to axially move toward the variable-volume chamber 36 by means of a preloaded helical compression spring 92 which is seated at one end on the inner face of the end wall 90 of the floating piston 88 and at the other end on the inner face of the end wall portion 38 of the lifter cylinder 32 as shown. In the presence of an oil pressure in the variable-volume chamber 58 forming part of the first axial bore 34 in the lifter cylinder 32, the oil pressure acts on the outer face of the end wall 90 of the floating piston 88 through the axial opening 84 in the balancing piston 82 and urges the floating piston 88 to axially move away from the balancing piston 82 against the force of the compression spring 92. If the force resulting from the oil pressure thus exterted on the floating piston 88 overcomes the force of the compression spring 92, the floating piston 88 is axially moved away from the variable-volume chamber 36 and forms in the second axial bore 36 of the lifter cylinder 32 a second variable-volume chamber between the end wall portion 90 of the floating piston 88 and the balancing piston 82 which is held in pressing contact with the end face of the annular internal ledge portion 40 of the lifter cylinder 32 by the force of the compression spring 86. If, however, the force resulting from the oil pressure acting on the floating piston 88 is overcome by the force of the compression spring 92, the floating piston 88 is held in contact with the balancing piston 82 and eliminates the above mentioned second variable-volume chamber. Thus, the second variable-volume chamber formed between the balancing anf floating piston 82 and 88 has a volume which is continuously variable between zero and a certain maximum value depending upon the oil pressure developed in the variable-volume chamber 58 forming part of the first axial bore 34 in the lifter cylinder 32.

When, therefore, the engine is operating at the maximum speed, the pressure of the engine oil which is directed from the engine oil gallery 30 into the variable-volume chamber 58 through the axial bore 50 in the plunger 48 and past the check valve assembly 70 maintains the floating piston 88 in an axial piston producing a maximum volume in the variable-volume chamber between the balancing and floating pistons 82 and 88 without respect to the axial position of the plunger 48 relative to the lifter cylinder 32 or, in other words, whether or not the cam 20 on the camshaft 22 is urging the lifter cylinder 32 to axially move away from the center axis of the camshaft 22. Under these conditions, the opening and closing timings and the amount of lift of the intake or exhaust valve controlled by the valve lifter are dictated faithfully by the external contour of the cam 20 as in the case of a valve train using a solid-type valve lifter.

Figure 2:
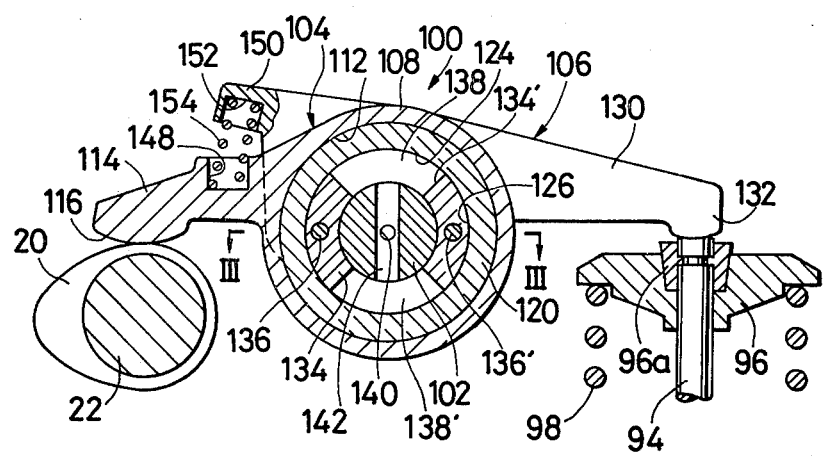
FIG. 2 is a cross sectional view showing, partly in side elevation, a preferred embodiment of the hydraulic valve lifter according to the present invention.

As the output speed of the engine is reduced, the engine oil pressure developed in the axial bore 50 in the plunger 48 is reduced accordingly. If, under this condition, the cam 20 on the camshaft 22 is in an angular position inoperative to exert a driving force on the lifter cylinder 32 as shown in FIG. 1, the oil pressure developed in the variable-volume chamber 58 and accordingly in the variable-volume chamber formed between the balancing and floating pistons 82 and 88 is also reduced as the engine slows down. When the decrement in the engine oil pressure thus reduced becomes such that the force resulting from the oil pressure developed in the variable-volume chamber between the balancing and floating pistons 82 and 88 and acting on the end wall portion 90 of the floating piston 88 is overcome by the opposing force of the compression spring 92, the floating piston 88 is axially moved toward the balancing piston 82 until equilibrium is obtained between the force of the spring 92 and the force resulting from the oil pressure acting on the floating piston 88. The volume of the variable-volume chamber between the balancing and floating pistons 82 and 88 is thus lessened continuously as the output speed of the engine decreases, provided there is no driving force exterted on the lifter cylinder 32 from the cam 20. Under idling conditions of the engine, the floating piston 88 is moved into the axial position bearing against the balancing piston 82 held in contact with the end face of the annular internal ledge portion 40 of the lifter cylinder 32 as illustrated in FIG. 2.

As the cam 20 is rotated about the center axis of the camshaft 22 and forces the lifter cylinder 32 to axially move away from the center axis of the camshaft 22, the lifter cylinder 32 and the plunger 48 having the push-rod seat member 52 being pressed upon by the push-rod 24 are urged to axially move relaitive to each other in a direction to contract the variable-volume chamber 58 between the plunger 48 and the balancing piston 82 and the variable-volume chamber between the balancing and floating pistons 82 and 88. Since, however, the oil in the variable-volume chamber 58 between the plunger 48 and the balancing piston 82 is prevented from flowing back into the axial bore 50 in the plunger 48 by the function of the check valve assembly 70, the oil which has been allowed into the variable-volume chamber 58 between the plunger 48 and the balancing piston 82 and the variable-volume chamber between the balancing and floating pistons 82 and 88 is confined therein so that the pressure of the oil in these chambers is caused to rise abruptly as the lifter cylinder 32 is driven by the cam 20 to axially move away from the center axis of the camshaft 22. Thus, the force of the oil pressure acting on the floating piston 88 is increased to such a degree as to easily overcome the opposing force of the compression spring 92 and causes the floating piston 88 to move into the axial position producing the maximum volume in the variable-volume chamber formed between the balancing and floating pistons 82 and 88. Under these conditions, the opening and closing timings of the intake or exhaust valve controlled by the valve lifter are retarded and advanced, respectively, and at the same time the amount of lift of the valve is reduced by amounts substantially proportional to the decrement in the engine oil pressure and accordingly in the output speed of the engine.

The hydraulic valve lifter thus constructed and arranged is used typically in a push-rod engine having a push-rod provided between the valve lifter and the rocker arm for the intake or exhaust valve for each power cylinder of the engine. If the valve lifter is to be used for an overhead camshaft engine in which the movement of the valve lifter is transmitted to the intake or exhaust valve of each power cylinder of the engine directly by a rocker arm, the valve lifter must be incorporated in its entirety in the rocker arm. Exacting design considerations are, however, necessitated in realizing such a mechanism in an ordinary overhead camshaft engine. The present invention contemplates provision of hydraulic valve lifter which is well compatible with an automotive internal combustion engine of the overhead camshaft type.

DESCRIPTION OF THE PREFERRED EMBODIMENTS

Figure 3:
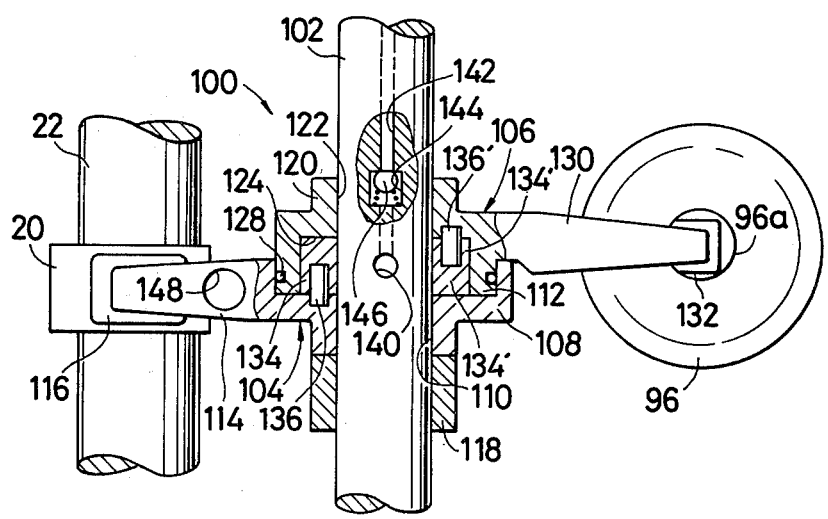
FIG. 3 is a plan view showing, partly in cross section taken on line II—II of FIG. 2, the embodiment illustrated in FIG. 2.

Referring to FIGS. 2 and 3 of the drawings, a hydraulic valve lifter embodying the present invention is provided directly between the cam 20 on the camshaft 22 and the intake or exhaust valve assembly of each power cylinder of an overhead camshaft internal combustion engine. The intake or exhaust valve assembly is partially shown to comprise a valve stem 94 having a disc-shaped spring retainter or seat member 96 securely fitted at one end of the valve stem by means of a retainer lock element 96a. Though not shown in the drawings, the valve stem 94 forms part of a poppet type valve having a valve head located and movable in conjunction with a valve seat provided between the combustion chamber of the engine cylinder and an intake or exhaust port of the cylinder, as is well known in the art. The valve is urged to move toward a position to block the communication between the combustion chamber and the intake or exhaust port by a helical valve spring 98 which is seated at one end on the spring retainer or seat member 96 and at the other end on a wall portion of the cylinder head (not shown) of the engine. The intake or exhaust valve assembly is assumed to be arranged so that the valve is axially movable back and forth in a direction which is perpendicular but not in intersecting relationship to the axis of rotation of the cam 20 as will be seen from FIGS. 2 and 3.

The hydraulic valve lifter, generally indicated at 100, comprises a turn shaft 102 having a center axis substantially parallel with the center axis of the camshaft 22. The turn shaft 102 is rotatable in both directions about the center axis thereof and is operatively connected to suitable drive means (not shown) adapted to cause the shaft to turn about its center axis in a direction and through an angle which are dictated by a control signal applied to the drive means from suitable control means responsive to prescribed operational conditions of a vehicle such as, for example, the engine speed, the load on the engine, or the vehicle speed.

The hydraulic valve lifter 100 further comprises first and second rockable members 104 and 106 which are rotatable independently of each other on the turn shaft 102. The first rockable member 104 has a hub portion 108 formed with an axial bore 110 and slidably mounted on the turn shaft 102 through the axial bore 110. The hub portion 108 of the first rockable member 104 is formed with a concavity 112 which is open at one axial end of the hub portion 108 and which has a circular cross section having a center axis substantially coincident with the center axis of the turn shaft 102. The first rockable member 104 further has an arm portion 114 projecting from the hub portion 108 in a direction substantially perpendicular to the center axis of the turn shaft 102 and formed with a lug 116 having a slightly curved surface engageable with the cam 20 on the camshaft 22. The first rockable member 104 thus arranged is prevented from being axially moved in one direction on the turn shaft 102 by means of a collar 118 securely fitted to the turn shaft 102 in such a manner that the rockable member 104 located to be engageable at the curved surface of the lug 116 of the arm portion 114 thereof is held in contact at one axial end of the hub portion 108 with one end face of the collar 118 as shown in FIG. 3. On the other hand, the second rockable member 106 has a hub portion 120 formed with an axial bore 122 and slidably mounted on the turn shaft 102 through the axial bore 122. The hub portion 120 of the second rockable member 106 is also formed with a concavity 124 which is open at one axial end of the hub portion 120 and which has a circular cross section having a center axis substantially in line with the center axis of the concavity 112 in the hub portion 108 of the first rockable member 104. The concavity 124 in the hub portion 120 of the second rockable member 106 is encircled in part by an annular wall substantially concentric to the concavity 124. The annular wall of the hub portion 120 of the second rockable member 106 is slidably received in the concavity 112 in the hub portion 108 of the first rockable member 104 so that the first and second rockable members 104 and 106 are pivotable about the center axis of the turn shaft 102 not only on the turn shaft 102 through the axial bores 110 and 122 in the respective hub portions 108 and 120 of the rockable members 104 and 106 but on each other through the slidable engagement between the respective hub portions of the rockable members 104 and 106. Between the respective hub portions 108 and 120 of the first and second rockable members 104 and 106 thus engaged by each other is formed an annular cavity 126 having axial ends at the bottom of the concavities 112 and 124 in the respective hub portions 108 and 120 of the first and second rockable members 104 and 106 and inner and outer circumferential ends respectively defined by the outer peripheral surface of the turn shaft 102 and the inner peripheral surface of the above mentioned annular wall of the hub portion 120 of the second rockable member 106. The annular wall of the hub portion 120 is formed with a circumferential groove which is open at the outer peripheral end of the annular wall and which has received therein an annular O-ring seal 128 maintaining hermetically sealed contact between the respective hub portions 108 and 120 of the first and second rockable members 104 and 106. The second rockable member 106 further has an arm portion 130 projecting from the hub portion 120 of the rockable member 120 in a direction substantially prependicular to the center axis of the turn shaft 102 and opposite to the direction in which the arm portion 114 of the first rockable member 104 projects from the hub portion 108 of the rockable member 104. The arm portion 130 of the second rockable member 106 is formed with a lug 132 having a slightly curved surface engageable with the valve stem 94 of the intake or exhaust valve assembly in a direction in which the valve stem 94 is axially movable. Though not shown, the second rockable member 106 is engaged by suitable stop means such as a helical compression spring arranged to limit the rotation of the rockable member 106 in a direction to have the arm portion 130 moved away from the valve stem 94.

With the annular cavity 126 thus formed between the respective hub portions 108 and 120 of the first and second rockable members 104 and 106 are provided arcuate first and second partition members 134 and 134' which are arcuately curved about the center axis of the turn shaft 102 and each of which has an arcuately curved inner surface slidable on the peripheral surface of the turn shaft 102 and opposite axial end faces which are respectively in contact with the bottom faces of the concavities 112 and 124 in the hub portions 108 and 120 of the first and second rockable members 104 and 106. The first and second partition members 134 and 134' are securely connected to the hub portions 108 and 120 of the first and second rockable members 104 and 106, respectively, by pins 136 and 136' which are arranged substantially in parallel with the center axis of the turn shaft 102. Thus, the first partition member 134 is rotatable with the first rockable member 104 about the center axis of the turn shaft 102 and has an arcuately curved outer surface slidable on the inner peripheral surface of the previously mentioned annular wall of the hub portion 120 of the second rockable member 106, while the second partition member 134 is rotatable with the second rockable member 106 about the center axis of the turn shaft 102 and has an arcuately curved outer surface in close contact with the inner peripheral surface of the annular wall of the hub portion 120 of the second rockable member 106. The partition members 134 and 134' have predetermined central angles preferably approximating 90 degrees as shown in FIG. 2 about the center axis of the turn shaft 102 and are normally angularly spaced apart from each other about the center axis of the shaft 102 for forming therebetween variable-volume oil chambers 138 and 138' which form part of the cavity 126 between the respective hub portions 108 and 120 of the first and second rockable members 104 and 106 and which are arcuately curved about the center axis of the turn shaft 102 as seen in FIG. 2. The sum of the respective volumes of the variable-volume oil chambers 138 and 138' remains contstant irrespective of the angular positions of the partition members 134 and 134' relative to each other about the center axis of the turn shaft 102.

Figure 4:
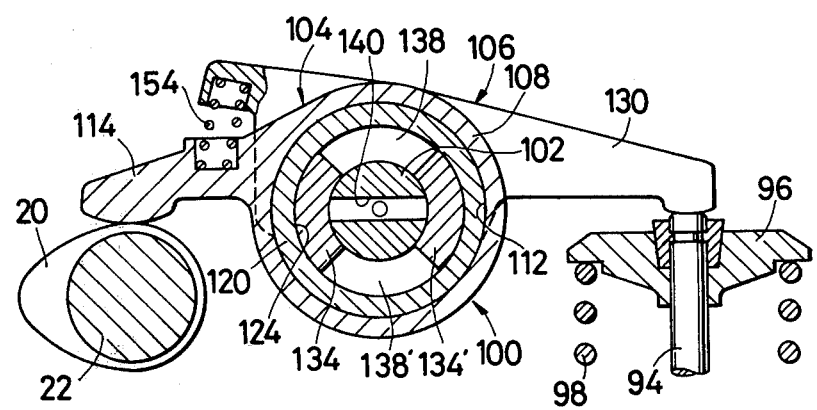
FIGS. 4 to 7 are views similar to FIG. 3 but shows various operational conditions of the hydraulic valve lifter illustrated in FIGS. 2 and 3.

The turn shaft 102 has formed in its axial portion encircled by the annular cavity 126 a diametral passageway 140 having opposite ends which are open to the above mentioned variable-volume oil chambers 136 and 136', respectively, between the partition members 134 and 134' as shown in FIG. 2 or covered and closed by the partition members 134 and 134', respectively, as shown in FIG. 4 depending upon the angular position of the turn shaft 102 relative to the partition members 134 and 134' and accordingly to the respective hub portions 108 and 120 of the first and second rockable members 108 and 120. The turn shaft 102 is further formed with an axial passageway 142 extending from the diametral passageway 140 in an axial direction of the turn shaft 120 and communicating with the delivery side of the engine oil pump (not shown) forming part of the lubricating system of the engine. In each of the variable-volume oil chambers 138 and 138' is thus developed an oil pressure which is continuously variable with the output speed of the engine when the turn shaft 102 has such an angular position relative to the partition members 134 and 134' as to allow the diametral passageway 140 to open at its opposite ends to the variable-volume oil chambers 138 and 138', respectively, as shown in FIG. 2. The axial passageway 142 in the turn shaft 102 forms in part a valve chamber 144 within which a spring-loaded ball check valve 146 is positioned to prevent engine oil from flowing backwardly away from the diametral passageway 140.

The rockable members 104 and 106 and the partition members 134 and 134' respectively connected thereto are arranged in such a manner that the partition members 134 and 124' are located substantially in diametrically opposed relationship to each other across the center axis of the turn shaft 102 when the arm portion 114 of the first rockable member 104 is in contact with a low, semicircular lobe portion of the cam 20 and at the same time the arm portion 130 of the second rockable member 106 is in engagement with the valve stem 94 of the intake or exhaust valve assembly in a fully open position, as shown in FIG. 2.

The first rockable member 104 has a recess 148 formed in the arm portion 114 thereof, while the second rockable member 106 has a projection 150 formed with a recess 152 which is located in the vicinity of and open toward the recess 148 in the arm portion 114 of the first rockable member 104 as shown in FIG. 2. A preloaded helical compression spring 152 is seated at one end with the recess 148 in the arm portion 114 of the first rockable member 104 and at the other end within the recess 152 in the projection 150 of the second rockable member 106. The spring 154 thus arranged is effective to urge the first and second rockable members 104 and 106 to maintain about the center axis of the turn shaft 102 such predetermined angular positions as to establish the above mentioned relationship between the first and second partition members 134 and 134'. The previously mentioned control and drive means connected to the turn shaft 102 are arranged in such a manner as to hold the turn shaft 102 in a predetermined first angular position having the diametral passageway 140 fully closed at the opposite ends thereof by the first and second partition members 134 and 134', respectively, when the engine is operating under full power conditions. The respective central angles of the arcuately curved partition members 134 and 134' are selected so that the diametral passageway 140 in the turn shaft 102 can be kept closed at its opposite ends by the partition members 134 and 134' when the first and second rockable members 104 and 106 are caused to turn about the center axis of the turn shaft 102 through angles corresponding to the maximum amounts of angular displacement of the rockable members 104 and 106, respectively, about the center axis of the turn shaft 102 which is held in the above mentioned first angular position thereof.

When the turn shaft 102 is thus held in the first angular position thereof and consequently the diametral passageway 140 in the turn shaft 102 is kept closed at its opposite ends by the first and second partition members 134 and 134', respectively, as illustrated in FIG. 4, the variable-volume oil chambers 138 and 138' formed between the partition members 134 and 134' are totally closed and, as a consequence, the engine oil which has been directed into the chambers 138 and 138' through the axial and diametral passageways 142 and 140 and past the check valve 146 is confined in each of the oil chambers 138 and 138'. As the cam 20 is rotated about the center axis of the cam shaft 22 and causes the arm portion 114 of the first rockable member 104 to move away from the center axis of the camshaft 22, the first rockable member 104 as a whole is driven to turn clockwise in FIG. 4 about the center axis of the turn shaft 102 and causes the first partition member 134 to turn about the center axis of the turn shaft 102 in a direction to contract one of the variable-volume oil chambers 138 and 138' and expand the other variable-volume oil chamber. Since, however, the engine oil which has been admitted into each of the variable-volume oil chambers 138 and 138' is constrained from the oil chambers with the turn shaft 102 held in the above mentioned first angular position thereof, the pressure imparted from the first partition member 134 to the engine oil in one of the variable-volume oil chambers 138 and 138' is substantially totally transferred through the oil in the particular oil chamber to the second partition member 134' and causes the second partition member 134' to turn together with the first partition member 134 about the center axis of the turn shaft 102. The first and second rockable members 104 and 106 are thus driven to turn as a single unit about the center axis of the turn shaft 102 as the cam 20 rolls on the arm portion 114 of the first rockable member 104 with the result the intake or exhaust valve having the valve stem 94 held in engagement with the arm portion 130 of the second rockable member 104 is driven to produce an amount of lift corresponding to the amount of angular displacement of the first rockable member 104 about the center axis of the turn shaft 102 as will be seen from FIG. 5 in which the first and second rockable members 104 and 106 are shown to be displaced through maximum angles from their respective initial angular positions about the center axis of the turn shaft 102 with the arm portion 114 of the first rockable member 104 contacted by the nose portion of the cam 20. When the first and second rockable members 104 and 106 are being thus moved as a single unit, the opening and closing timings and the amount of lift of the intake or exhaust valve controlled by the valve lifter 100 are dictated faithfully by the external contour of the cam 20 so that the valve lifter 100 functions similarly to an ordinary solid-type valve lifter producing fixed valve timings and lift.

Figure 6:
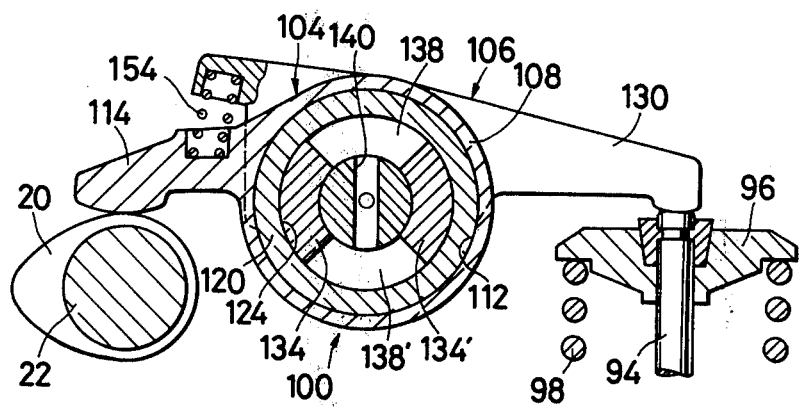
Figure 7:
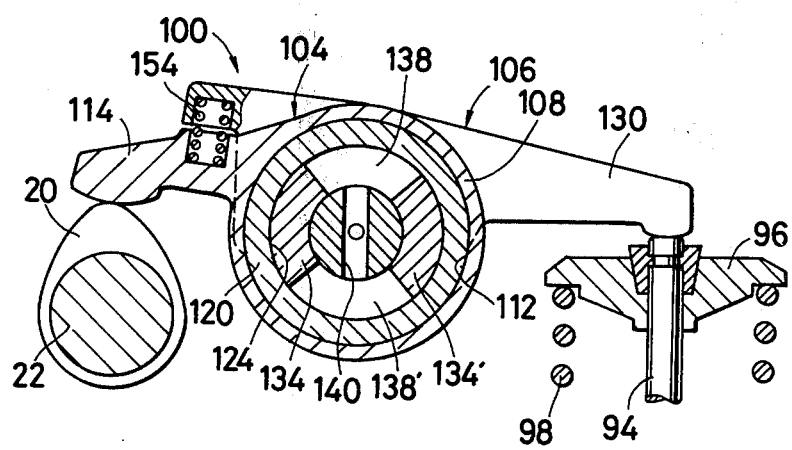

Under idling conditions of the engine, the control and drive means (not shown) connected to the turn shaft 102 are conditioned to hold the turn shaft 102 in a predetermined second angular position which is in the embodiment herein shown assumed to be about 90 degrees displaced from the first angular position of the shaft 102 as shown in FIGS. 6 and 7. When the turn shaft 102 is held in the second angular position thereof, the diametral passageway 140 in the turn shaft 102 is kept open at its opposite ends to the variable-volume oil chambers 138 and 138' between the first and second partition members 134 and 134' without respect to the angular positions of the partition members 134 and 134' relative to the turn shaft 102. When the first rockable member 104 and accordingly the first partition member 134 connected thereto are driven to turn clockwise in FIG. 1 about the center axis of the turn shaft 102, the first partition member 134 urges one of the variable-volume oil chambers 138 and 138' to contract and the other variable-volume oil chamber to expand. Communication being established between the diametral passageway 140 in the turn shaft 102 and each of the variable-volume oil chambers 138 and 138', the engine oil in the variable-volume oil chamber thus urged to contract is forced to flow through the diametral passageway 140 into the variable-volume oil chamber being urged to expand so that the pressure imparted from the first partition member 134 to the oil in the variable-volume chamber being urged to contract is not transferred to the second partition member 134'. The angular movement of the first rockable member 104 as caused by the cam 20 is thus totally taken up by the displacement of the engine oil from one of the variable-volume oil chambers 138 and 138' to the other so that the second partition member 134' and accordingly the second rockable member 106 are held in situ and are maintained inoperative to drive the intake or exhaust valve as will be seen from FIG. 7.

Figure 8:
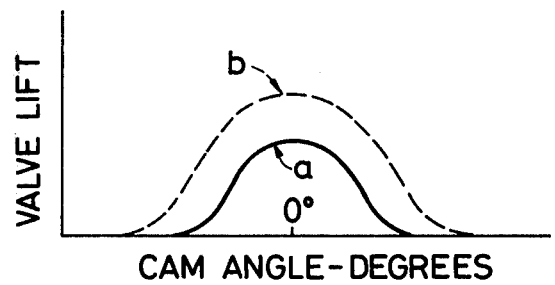
FIG. 8 is a graph showing valve lift curves which can be obtained by the hydraulic valve lifter embodying the the present invention when the valve lifter is operated in a predetermined manner.

The control and drive means connected to the turn shaft 102 are adapted to be operable for turning the shaft 102 continuously between the above mentioned first and second angular positions depending upon the operating conditions of the engine which are variable between the full power and idling conditions. If, in this instance, the control and drive means for the turn shaft 102 are arranged in such a manner that the turn shaft 102 is driven to turn clockwise from the first angular position illustrated in each of FIGS. 4 and 5 to the second angular position illustrated in each of FIGS. 6 and 7 about the center axis of the shaft 102, the first partition member 134 connected to the first rockable member 104 operated by the cam 20 is driven to turn about the center axis of the turn shaft 102 in a direction to first hold the diametral passageway 140 in the turn shaft 102 open at both ends thereof to the variable-volume oil chambers 138 and 138' and thereafter cause the passageway 140 to close at one end thereof. Under these conditions, the timing at which communication is to be built up between the variable-volume oil chambers 138 and 138' through the diametral passageway 140 and the timing at which the communication is blocked by the first partition member 134 are retarded and advanced, respectively, from those achieved with the turn shaft 102 held in the first angular position thereof and at the same time the angular displacement of the first rocking member 104 is partially taken up by the displacement of the engine oil from one of the variable-volume oil chambers 138 and 138' to the other. The opening and closing timings of the intake or exhaust valve controlled by the valve lifter 100 are therefore retarded and advanced, respectively, and furthermore the amount of lift of the valve is reduced from those achieved under full power conditions of the engine as will be seen from the graph of FIG. 8 in which curve a in solid line indicates the valve lift thus adjusted and curve b in broken line indicates the non-adjusted valve lift to be achieved under full power conditions of the engine. The amounts of retardation and advance of the opening and closing timings of the intake or exhaust valve and the decrement of the amount of lift of the valve thus adjusted are dictated by the angle of displacement of the turn shaft 102 from the first angular position thereof.

Figure 5:
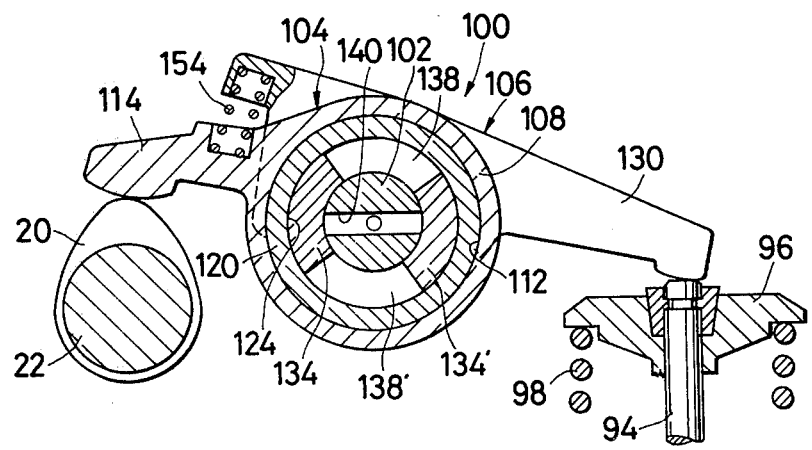
Figure 9:
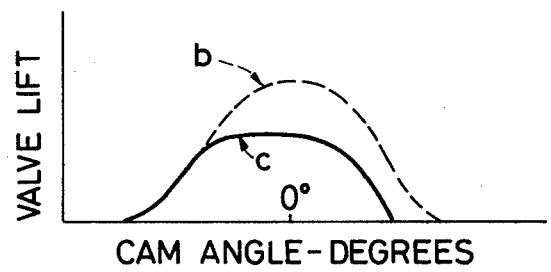
FIG. 9 is a graph similar to FIG. 8 but shows valve lift curved which can be obtained by the hydraulic valve lifter embodying the present invention when the valve lifter is controlled in another predetermined manner.

On the other hand, if the control and drive means for the turn shaft 102 are arranged in such a manner as to drive the turn shaft 102 in a counter-clockwise direction from the first angular position shown in each of FIGS. 4 and 5 to the second angular position shown in each of FIGS. 6 and 7, the first partition member 134 connected to the first rockable member 104 operated by the cam 20 is driven to rotate the turn shaft 102 about the center axis of the shaft 102 in a direction to first hold the diametral passageway 140 in the turn shaft 102 closed at one end thereof and thereafter allow the passageway 140 to open at both ends thereof to the variable-volume oil chambers 138 and 138'. Under these conditions, the timings at which the communication between the variable-volume oil chamber 138 and 138' through the diametral passageway 140 is to be built up and blocked are substantially identical to those achieved with the turn shaft 102 held in the first angular position thereof but the angular displacement of the first rockable member 104 driven by the cam 20 is partially taken up by the displacement of the engine oil from one of the variable-volume oil chambers 138 and 138' to the other when the diametral passageway 140 in the turn shaft 102 is open at both ends thereof. The opening and closing timings thus achieved of the intake or exhaust valve are therefore substantially identical with those achieved under full power conditions of the engine and only the amount of lift of the valve is reduced as compared with the non-adjusted valve lift, as will be seen from the graph of FIG. 9 in which the valve lift adjusted as above described is indicated by curve c in solid line in comparison with the non-adjusted valve lift indicated by curve b in broken line. Thus, the control and drive means for the turn shaft 102 may be arranged appropriately to obtain either of the valve lift characteristics indicated by curves a and c in FIGS. 8 and 9.

Under medium-to-low operating conditions of the engine, the turn shaft 102 is held in an angular position communication between the variable-volume oil chambers 138 and 138' through the diameteral passageway 140 in the turn shaft 102 during each cycle of operation in which the cam 20 makes a turn about the center axis of the camshaft 22. If the turn shaft 102 in such an angular position is driven to turn rapidly to the first angular position thereof as during abrupt acceleration of the vehicle, it may happen that the first and second rockable members 104 and 106 are locked together in a condition in which the angular displacement of the first rockable member 104 with respect to the second rockable member 106 is partially taken up. When this occurs, the first and second rockable members 104 and 106 could be disabled from transmitting the lift of the cam 20 to the valve stem 94 of the intake or exhaust valve assembly in a proper condition. To prevent this from occurring, the control and drive means for the turn shaft 102 may be provided with suitable delay means capable of retarding the action of the drive means in response to abrupt acceleration of the vehicle or, as an alternative, an auxiliary oil circuit may be provided in the valve lifter for allowing the first and second rockable members 104 and 106 to resume proper angular positions relative to each other before the rockable members 104 and 106 are to be locked together with the engine oil confined in at least one of the variable-volume oil chambers 138 and 138'. A preferred embodiment of a hydraulic valve lifter provided with such an auxiliary oil circuit is shown in FIGS. 10 and 11.

Figure 10:
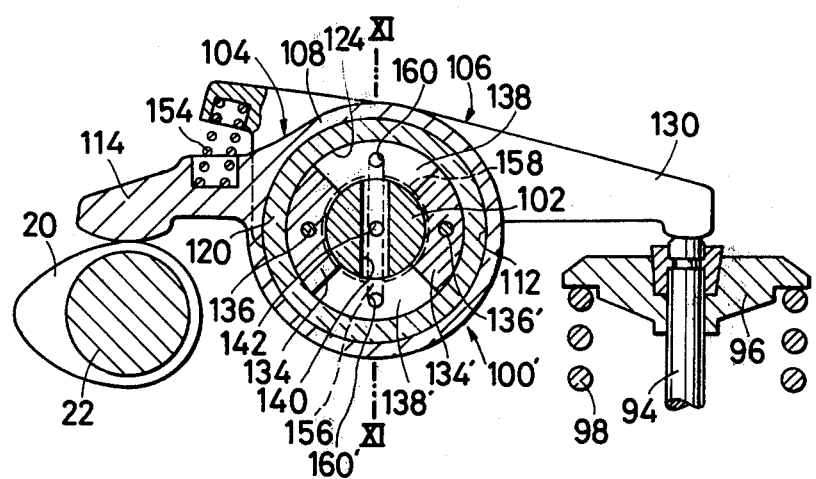
FIG. 10 is a cross sectional view showing, partly in side elevation, a modification of the embodiment illustrated in FIGS. 2 to 7.
Figure 11:
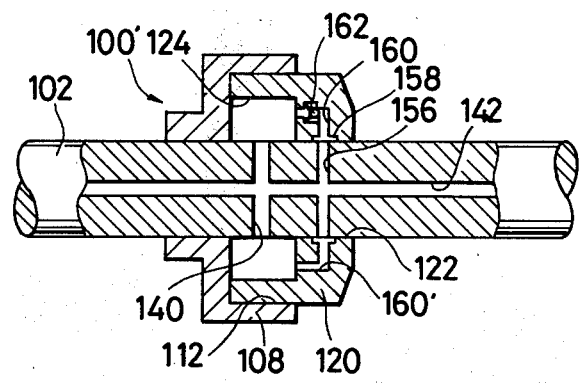
FIG. 11 is a longitudinal sectional view of the embodiment illustrated in FIG. 10, the section being taken in a plane indicated by line XI—XI in FIG. 10.

Referring to FIGS. 10 and 11, the hydraulic valve lifter, which is now designated in its entirety by reference numeral 100', has formed in the turn shaft 102 an auxiliary diametral passageway 156 which is branched from the axial passageway 142 also formed in the turn shaft 102 and which has opposite ends adjacent to the inner peripheral end of the hub portion 120 of the second rockable member 106 which is formed with the axial bore 122 in the hub portion 120. The auxiliary diametral passageway 156 thus formed in the turn shaft 102 is assumed, by way of example, to be arranged substantially in parallel with the main diametral passageway 140 in the turn shaft 102 as will be better seen from FIG. 11 but may be directed in an arbitrarily desired angular relationship to the main diametral passageway 140. The axial passageway 142 in the turn shaft 102 in the embodiment of FIGS. 10 and 11 is devoid of the check valve 146 provided in the turn shaft 102 of the arrangement illustrated in FIG. 3.

The hub portion 120 of the second rockable member 106 has formed in its inner peripheral wall in slidable contact with the turn shaft 102 an annular groove 158 encircling the outer peripheral surface of the turn shaft 102. The above mentioned auxiliary diametral passageway 156 in the turn shaft 102 is constantly open at its opposite ends to this annular groove 158 in second rockable member 106. The hub portion of the second rockable member 106 is further formed with first and second passageways 160 and 160' each of which is open at one end to the annular groove 158 and at the other end to the concavity 124 in the hub portion 120. The respective open ends of the passageways 160 and 160' to the concavity 124 are located to be capable of being open to the variable-volume oil chambers 138 and 138', respectively, between the first and second partition members 134 and 134' without respect to the relative angular position between the first and second partition members 134 and 134' which are rotatable about the center axis of the turn shaft 102 through predetermined maximum angles which are dictated by the maximum amount of angular displacement of the first rockable member 104 to be moved by the cam 20. The first passageway 160 formed in the hub portion 120 of the second rockable member 106 is open to the variable-volume oil chamber 138 to be urged to contract when the first rockable member 104 is driven by the cam 20 and is provided with a check valve 162 which is arranged so that the engine oil which has been admitted into the variable-volume oil chamber 138 past the check valve 162 is prevented from flowing back from the oil chamber 138 when the oil chamber 138 is urged to contract.

When the turn shaft 102 which has been held in an angular position having the main diametral passageway 140 open to the variable-volume oil chambers 138 and 138' as shown in FIG. 10 is driven to rapidly turn about the center axis thereof into an angular position having the main diametral passageway 140 closed at both ends thereof by the first and second partition members 134 and 134', the variable-volume oil chambers 138 and 138' are isolated from the main diametral passageway 140 but communication is maintained from the axial passageway 142 in the turn shaft 102 to the variable-volume oil chambers 138 and 138' through the auxiliary diametral passageway 156 in the turn shaft 102, the annular groove 158 and the first and second passageway 160 and 160', respectively, in the hub portion 120 of the second rockable member 106. When the first and second partition members 134 and 134' are driven to turn relative to each other about the center axis of the turn shaft 102 is a direction to expand the variable-volume oil chamber 138 and contract the variable-volume oil chamber 138', the engine oil in the latter variable-volume oil chamber 138' force to partially flow into the axial passageway 142 in the turn shaft 102 through the second passageway 160' and, in turn, additional engine oil is admitted into the variable-volume oil chamber 160 through the valved first passageway 160 in the rockable member 106, thereby allowing the first and second rockable members 104 and 106 to resume their proper angular positions. When the first rockable member 104 and accordingly the first partition member 134 are thereafter driven to turn about the center axis of the turn shaft 102 in the direction to contract the variable-volume oil chamber 138 and expand the variable-volume oil chamber 138', the engine oil which has been admitted into the former variable-volume oil chamber 138 is confined therein by means of the check valve 162 provided in the first passageway 160 in the second rockable member 106 so that the first and second partition members 134 and 134' and accordingly the first and second rockable members 104 and 106 are bodily turned about the center axis of the turn shaft 102.

It has been assumed that the hydraulic valve lifter embodying the present invention is to be incorporated into the valve train of an overhead-camshaft internal combustion engine. A hydraulic valve lifter according to the present invention is, however, also compatible with a push-rod internal combustion engine if the second rockable member 106 is connected to or otherwise engaged by the push rod engaging the rocker arm for the intake or exhaust valve. When a valve lifter provided by the present invention is incorporated in an automotive internal combustion engine of any type, the engine may dispense with the throttle valve in the carburetor because the supply rate of the air-fuel mixture to each of the power cylinders of the engine can be controlled by regulating the amount of lift of the intake valve by means of the valve lifter. The hydraulic valve lifter according to the present invention will also be utilized for accurately controlling the valve overlap or maintaining the intake valve fully closed under decelerating condition of the vehicle so as to provide enhanced emission control.

While, furthermore, it has been assumed that the shaft carrying the first and second rockable members is arranged to be rotatable about the center axis of the shaft, such a shaft may be replaced with a shaft which is axially movable so that the communication between the source of the engine oil and each of the variable-volume oil chambers can be selectively built up or blocked depending upon the axial position of the shaft relative to the first and second partition members. The control and drive means for the rotatable or axially movable shaft may be arranged to be responsive to a change in the position of the accelerator pedal or the throttle valve in the carburetor of the engine or to the variation in the vehicle speed, the revolution speed of the engine crankshaft or the vacuum developed in the intake manifold of the engine.

What is claimed is:

1. A hydraulic valve lifter for an internal combustion engine having at least one power cylinder including intake and exhaust valves, a cam for operating at least one of the valves and a source of fluid under pressure continuously variable with the power output of the engine, comprising a shaft having a center axis therethrough, a first rockable member pivotable on said shaft about said center axis and engaging said cam, a second rockable member pivotable on said shaft about the center axis of the shaft and engaging at least one of said valves, the first and second rockable members being formed with respective concavities forming in combination an annular cavity encircling an axial portion of said shaft, first and second partition members fitting in said annular cavity and rotatable with said first and second rockable members, respectively, about the center axis of said shaft, the first and second partition members forming therebetween arcuately curved variable-volume fluid chambers which are continuously variable in volume in complementary relationship to each other depending upon the relative angular position between said shaft and each of the partition members, said shaft having formed in said axial portion thereof a fluid passageway which is in constant communication with said source of fluid and which is open to at least one of said variable-volume fluid chambers or closed by at least one of said partition members depending upon the relative position between said shaft and each of the partition members.

2. A hydraulic valve lifter as set forth in claim 1, in which said shaft is rotatable about the center axis thereof and in which said fluid passageway is open at least one of said variable-volume fluid chambers or closed by at least one of said partition members depending upon the relative angular position between said shaft and each of the partition members about the center axis of the shaft.

3. A hydraulic valve lifter as set forth in claim 2, in which said fluid passageway is formed substantially diametrically in said axial portion of said shaft.

4. A hydraulic valve lifter as set forth in claim 3, in which said shaft is further formed with an axial passageway providing constant communication between said fluid passageway and said source of fluid under pressure.

5. A hydraulic valve lifter as set forth in claim 4, further comprising check valve means provided in said axial passageway for preventing fluid from flowing away from said fluid passageway toward said source of fluid.

6. A hydraulic valve lifter as set forth in claim 3, in which said shaft is further formed with an auxiliary passageway communicating with said source of fluid under pressure and in which said second rockable member is formed with first and second passageways which are in constant communication with said auxiliary passageway irrespective of the angular position of said shaft relative to the second rockable member and which are open to said variable-volume fluid chambers, respectively, at least when said fluid passageway is closed by at least one of said partition members.

7. A hydraulic valve lifter as set forth in claim 6, further comprising check valve means provided in one of said first and second passageways for preventing fluid from flowing backwardly toward said source of fluid under pressure from the variable-volume fluid chamber to which the passageway provided with said check valve means is open.

8. A hydraulic valve lifter as set forth in claim 6 or 7 in which said shaft is further formed with an axial passageway providing constant communication among said fluid passageway, said auxiliary passageway and said soruce of fluid under pressure.

9. A hydraulic valve lifter as set forth in claim 6, 7 or 8, in which said second rockable member is further formed with an annular groove encircling said axial portion of said shaft and providing constant communication between said auxiliary passageway in the shaft and each of said first and second passageways in the second rockable member irrespective of the relative angular position between said shaft and said second rockable member about the center axis of the shaft.

10. A hydraulic valve lifter as set forth in any one of claims 1 to 7, further comprising biasing means engaging said first and second rockable members and operative to urge the first and second rockable members toward predetermined angular positions relative to each other about the center axis of said shaft.

* * * * *